United States Patent [19]

Dalton

[11] Patent Number: 4,855,043
[45] Date of Patent: Aug. 8, 1989

[54] WATER CONDITIONING SYSTEM

[75] Inventor: Danny L. Dalton, Provo, Utah

[73] Assignee: Quantum Conditioning Technology, Inc., Salt Lake City, Utah

[21] Appl. No.: 49,798

[22] Filed: May 15, 1987

[51] Int. Cl.$^4$ .................................................. C02F 1/42
[52] U.S. Cl. .................................... 210/190; 210/269; 210/284; 210/290
[58] Field of Search ............... 210/677, 685, 686, 190, 210/191, 269, 283, 284, 290

[56] References Cited

U.S. PATENT DOCUMENTS

| | | | |
|---|---|---|---|
| 3,465,880 | 9/1969 | Lyall | 210/190 |
| 3,719,591 | 3/1973 | Crits | 210/283 |
| 3,842,002 | 10/1974 | Boari | 210/685 |
| 4,163,717 | 8/1979 | Blind et al. | 210/677 |
| 4,383,920 | 5/1983 | Muller et al. | 210/284 |

*Primary Examiner*—Ivars Cintins
*Attorney, Agent, or Firm*—Robert B. Crouch

[57] ABSTRACT

A water conditioning system which employs a blend of sodium cation exchange resins and chloride anion exchange resins in a common tank and means for regenerating the resins in a specified sequence to prevent buildup of impurities in the resin bed.

6 Claims, 1 Drawing Sheet

WATER CONDITIONING SYSTEM

The present invention relates to a water conditioning system and more particularly to a food service water conditioner.

BACKGROUND OF THE INVENTION

Up to the present time problems have existed in connection with the food service industry, and in particular, retail establishments which utilize domestic water in the preparation or storage of food and beverages. These problems derive from the fact that water conditioners available on the market which are suitable for residential or commercial use are not adaptable to the fast food and restaurant industry. As a consequence, such establishments rely heavily on the use of the local or domestic water supply with whatever impurities may be present, such as: minerals, gases, organic contaminants, acids, etc.

Commercial or industrial water treatment equipment that can effectively remove all impurities which affect the taste of water are both expensive and bulky to install and operate. The substantial overall size and initial cost, along with the potential safety hazard inherent in storage and handling of the acids employed in regeneration of such units, renders them unsuitable for the small or medium sized retail outlet. On the other hand, the typical residential water softeners are effective in removing minerals and metals from domestic water to improve laundry capabilities and prevent build-up of hard water scale in plumbing and appliances. However, such conditioners are not readily applicable to the food service industry because of the impurities and residue of sodium left in the treated water. Such conditioners typically utilize sodium cation exchangers and generally operate on a three-cycle mode, i.e., service, brining, and rinsing. This is adequate for residential use, but it does not effectively clean impurities from the resins of the exchanger or even completely remove the sodium chloride used in the brining. The consequent sodium residue has a decided adverse effect in food service, since it interferes with carbonation. The sodium residue inhibits absorption of carbon dioxide such that a soft drink mixed from water treated by such a unit is flat instead of sparkling. In addition, the carbon dioxide enhances the taste of the impurities, such as organic matter, gases, acids, etc. which readily pass through the typical residential water softener. This inevitably results in a fountain drink which is flat and has a peculiar, if not unpleasant, taste.

As a consequence of the above, the food service industry has, by necessity, elected, with few exceptions, to utilize untreated water from the local water supply. The impurities in such water create a variety of problems which are expensive to overcome. Frequent cleaning and repair of equipment is necessary to prevent build-up of hard water scale (lime) in coffee makers, hot dog steamers, water-cooled condensers, etc., and increased energy costs are encountered in the operation of such equipment with untreated water. Furthermore, the tastes imparted by the impurities have had to be masked by increased quantites of syrup, coffee, or hot chocolate employed in the preparation of such beverages. For instance, soft drink bottlers, which are able to afford the large and expensive commercial water treatment equipment, typically employ a mixture of six parts water per unit of syrup, while fountain mixed soft drinks typically employ a mixture of 4.5 parts water per unit of syrup.

SUMMARY OF THE INVENTION

The present invention provides a compact, inexpensive water conditioner which is particularly suited for the food service industry. This conditioner employs a blend of sodium cation exchange resins and chloride anion exchange resins in a common tank to remove a wide range of impurities and produce pure water with a constant taste. The resins which constitute the ion exchangers are selected for particular characteristics and then blended in ratios within a specified range to prevent adverse chemical reaction during service of the conditioner. In addition, regeneration of the resins is carried out in a specified sequence to prevent build-up of impurities in the resin bed.

DETAILED DESCRIPTION

Figure 1:
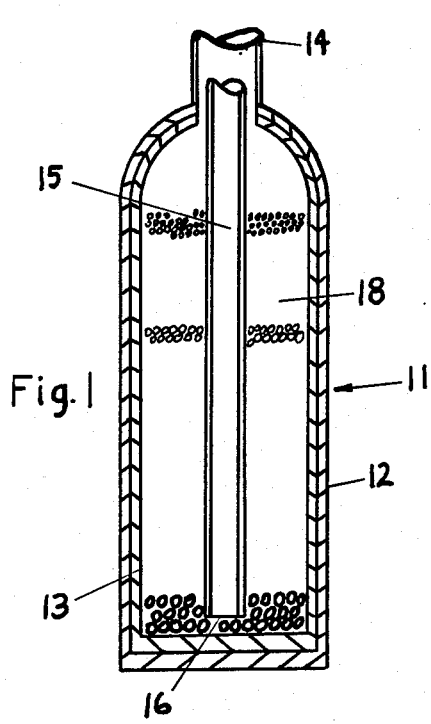
FIG. 1 is an elevation view in section of a single tank illustrating the components of the present invention.

Referring more particularly to FIG. 1 of the drawing the water conditioning system of the present invention is depicted as including a corrosion-resistant composition tank 11 which contains a bed 18 of ion exchange resins. The tank 11 comprises a filament wound fiber glass shell 12 and an ABS plastic liner 13. The tank is positioned in the manner shown with a fluid inlet pipe 14 connected to the upper end, so that fluid admitted through the inlet pipe will flow vertically from the upper end through the resin bed 18 to the lower end 19 of the tank. An elongated recovery tube 15 extends through the upper end of the tank 11 and over the length thereof, terminating adjacent the lower end 19. The distel end of the recovery tube 15 is fitted with a screen 16, or similar means, which will permit passage of fluids, but block entry of solid particles.

Figure 2:
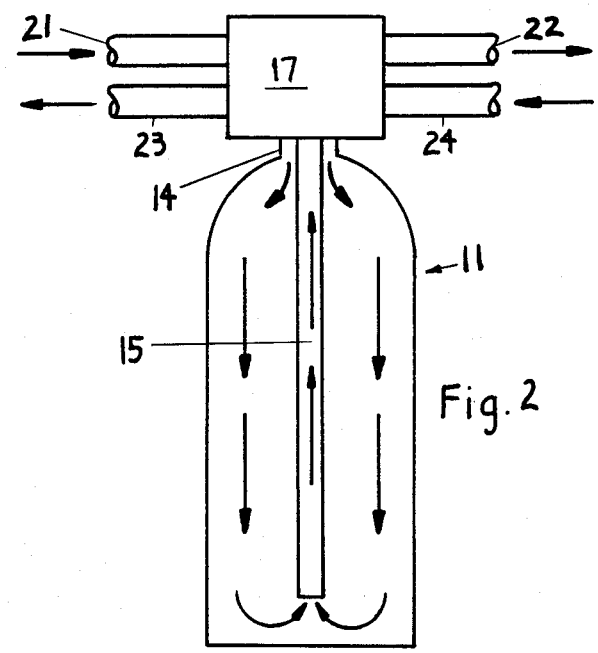
FIG. 2 is a schematic diagram showing the direction of fluid flow through the present system.

As shown in FIG. 2, the upper extremities of the inlet pipe 14 and the recovery tube 15 are connected to a regeneration valve 17 which has the necessary plumbing connections required for automatic operation, i.e., 21 and 22 for connection into the local water supply, and 23 and 24 for connection to the regeneration system. The valve 17 is a conventional water conditioning valve, such as the Fleck 9000 manufactured by the W. W. Fleckenstein Co., and includes an adjustable timer for controlling the occurrence of the regeneration cycle.

The resin bed 18 is made up of a blend of sodium-type cation exchangers and chloride-type anion exchangers produced in granular or bead form. Resins are selected which are compatible, i.e., produce little or no chemical reaction when combined together in a common tank. The compatibility derives in part from the composition of the individual resins selected and further from the ratio of the resins employed in the blending. An example of a suitable dual-resin blend is Dowex and Purolite GAC-30 combined in a mixture of 80 to 95% Dowex and 20 to 5% Purolite GAC-30. During the manufacturing process, the cation exchange resin is poured into the tank 11, filling the bottom portion thereof, and then the anion exchange resin is distributed on top of the cation resin. It is necessary that the different resins be stratified, but the fact that some mixing may occur during handling or shipping is overcome when the resin bed is immersed in water, since the anion resin is less dense that the cation resin and will float to the top of the bed.

Figure 3:
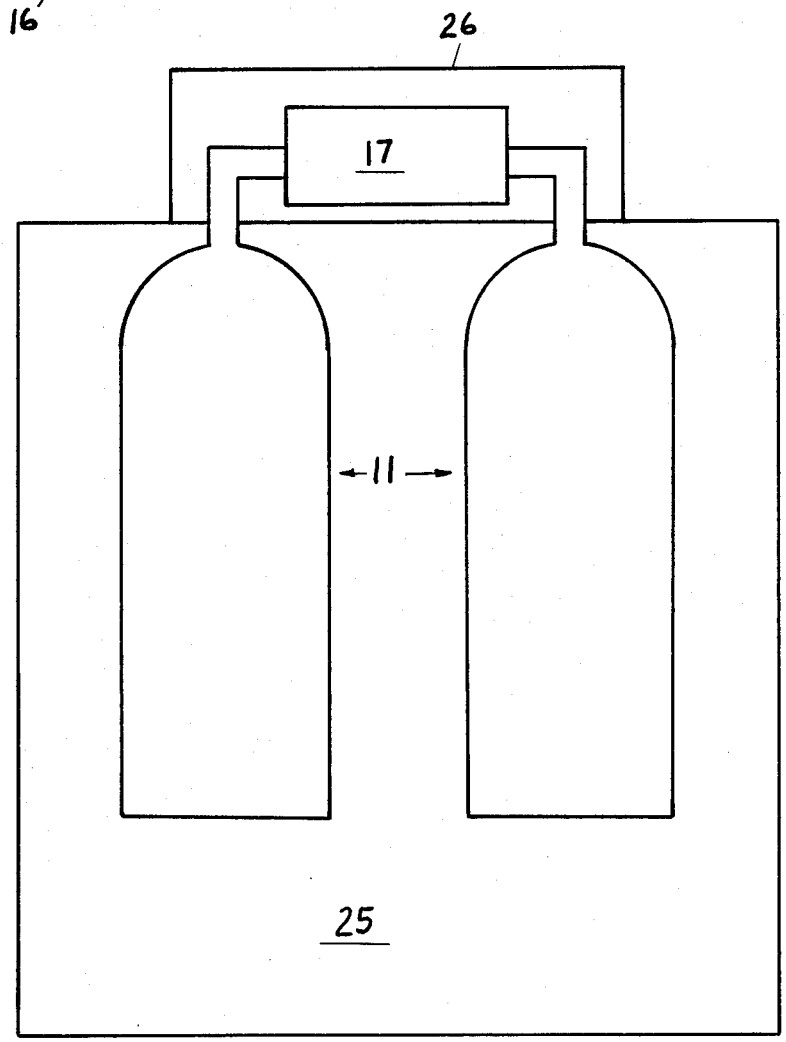
FIG. 3 is an elevation view, partly in section, illustrating a dual-tank water conditioning system according to the present invention.

A dual-tank embodiment of the present invention is illustrated in FIG. 3 of the drawing in which two of the tanks 11 are connected to a common valve 17 and are mounted in a corrosion-resistant, cylindrical brine tank 25. The tanks 11 are suspended within the brine tank 25 so as to be partially submerged in the salt and/or brine solution contained therein. The valve 17 and the connections to the tanks 11 protrude above the level of the brine and are covered by a protective lid or cover 26. Access to the interior of the brine tank 25 for the purpose of periodic addition of salt (NaCl) is provided through a door (not shown) located near the upper edge of the tank.

In the operation of the present system, water from the local water supply 21 is directed by the valve 17 through inlet pipe 14 into the interior of the tank 11. As indicated by the arrows in FIG. 2 of the drawing, the water flows vertically down within the tank passing initially through the anion exchange resin, then through the cation exchange resin to the lower end 19 of the tank where it enters the recovery tube 15 and flows vertically up to the valve 17 and then into the water supply system 22. As the water passes through the blended resin bed, the negative ions, such as carbonates, sulfates, sulfides, sulfites, nitrates, and phosphates, along with chromates, arsenates and natural organics, such as fulvic and humic acids and tannins are taken up by the chloride anion exchange resin and replaced by equivalent amounts of chloride. As the partially treated water then passes through the sodium cation exchange resin, a variety of positive metallic ions, primarily calcium, magnesium, manganese, and iron, but also including lead, cadmium, mercury, zinc and aluminum, are taken up and held by the cation exchanger which simultaneously gives up an equivalent amount of sodium in exchange for them. When the ability of the ion exchangers to produce suitable conditioned water is exhausted, the resin bed is regenerated with a solution of common salt (sodium chloride) which removes the metals in the form of their soluble chlorides, carbonates, sulfates, etc. and simultaneously restores the anion and cation exchangers to their chloride and sodium states, respectively. The resin bed is then rinsed free of the soluble by-products and the excess salt and the system returned to service. Both the anion and cation exchange resins are regenerated with the same salt solution, but the salt solution must be passed through the anion exchanger before it passes through the cation exchanger to prevent build-up of calcium chloride in the anion exchanger. This is accomplished in the present invention by the utilization of a down-brining technique. This technique is practical in the present system because, during the operation of the system, the anion exchange resin will float to the top and will therefore position itself in a layer above the cation exchange resin.

To achieve thorough cleaning of the resin bed, a five cycle regeneration process is employed. In this process, the valve 17 directs brine (salt solution) from the connection 23 with the brine tank 25 through the inlet pipe 14 where it courses vertically down through the resin bed, then through the recovery tube 15 to the valve where it is discharged through the drain connection 24.

When the initial brine cycle is completed, treated water from connection 22 is directed by the valve through the inlet pipe to rinse the soluble by-products from the resin bed and discharge them through the recovery tube to the drain. A second brining cycle is then performed by the valve to ensure complete regeneration of the entire resin bed. This is then followed by two further rinse cycles to clean completely the soluble by-products and any excess sodium chloride from the resin bed. The conditioner is then ready to be returned to service.

The dual-tank embodiment of FIG. 3 is particularly suited for establishments which are open 24 hours per day, since it is capable of continuous service. The valve 17 switches one tank into service until it is ready to be regenerated, then switches the second tank on line while the first tank is being regeneraged. The tanks are alternately regenerated, so one tank or the other is in service at all times.

The water conditioning system of the present invention provides water with a constant taste, since it effectively removes a wide range of impurities as well as excess sodium chloride from the conditioning process itself.

While the present invention has been disclosed and described as applied to the food service industry and to a dual-tank conditioner for continuous service, it should be understood that the teachings of the invention are applicable to residential and domestic applications with requirements for a single tank conditioner.

It will be obvious to those skilled in the art that various changes may be made without departing from the scope of the invention and the invention is not to be considered as limited to what is shown in the drawing and described in the specification.

What I claim as my invention is:

1. A compact water conditioner for food service applications which includes an enclosed tank containing a stratified resin bed, inlet means and resin regenerating means, said resin bed including a first layer of chloride-anion exchange resin for removing negative ions of water-borne chemicals, gases and acids circulating through the tank, and a second layer of sodium-cation exchange resin for removing water-borne positive metallic ions, said first layer being deposited upon said second layer and said resins being compatible,
    said inlet means including means for directing untreated water onto the stratified resin bed and through the layers in sequence, and
    said resin regenerating means including means for passing a salt solution through the first layer and then through the second layer to regenerate both layers with the same solution.

2. A food service water conditioner as defined in claim 1 in which said first and second resins are present in a ratio within the range of 5–20% anion to 95–80% cation.

3. A food service water conditioner as defined in claim 1 in which said first and second resins are present in a ratio of approximately 1 to 4.

4. A compact water conditioner for food service applications which includes a pair of enclosed tanks, a regeneration valve, and a brine tank, said enclosed tanks being suspended within said brine tank and connected to said valve, each of said tanks containing a stratified resin bed, inlet means, and resin regenerating means, each resin bed includng a first layer of chloride-anion exchange resin for removing negative ions of water-borne chemicals, gases and acids circulating through the tank, and a second layer of sodium-cation exchange resins for removing water-borne positive metallic ions, said first layer being deposited upon said second layer and said resins being chemically compatible, each inlet means including means for directing untreated water from said valve onto the stratified resin bed and through the layers in sequence, and each regenerating means including means for passing brine from said brine tank through the first layer and then through the second layer to regenerate both layers, said valve including means for connecting untreated water to one enclosed tank and brine to the other enclosed tank and periodically reversing the connections to provide continuous water conditioning service.

5. A food service water conditioner as defined in claim 4 in which said first and second resins are present in a ratio within the range of 5–20% anion to 95–80% cation.

6. A food service water conditioner as defined in claim 4 in which said first and second resins are present in a ratio of approximately 1 to 4.

* * * * *